United States Patent
Brissot

[15] 3,663,180
[45] May 16, 1972

[54] METHOD OF PRODUCING CALCIUM CARBONATE SINGLE CRYSTALS

[72] Inventor: Jean Jacques Lucien Emile Brissot, Maisons Alfort, France

[73] Assignee: U.S. Philips Corporation, New York, N.Y.

[22] Filed: Oct. 22, 1970

[21] Appl. No.: 82,870

[30] Foreign Application Priority Data

Nov. 21, 1969 France .................. 6940146

[52] U.S. Cl. .................. 23/301 SP, 23/304, 23/66
[51] Int. Cl. .................. B01j 17/10, B01j 17/14
[58] Field of Search .................. 23/301 SP, 304, 66, 300

[56] References Cited

UNITED STATES PATENTS

| | | |
|---|---|---|
| 2,747,971 | 5/1956 | Hein .................. 23/301 |
| 2,990,261 | 6/1961 | Greiner .................. 23/301 |
| 3,238,024 | 3/1966 | Cremer et al. .................. 23/301 |
| 3,345,141 | 10/1967 | Nester et al. .................. 23/304 |
| 3,396,059 | 8/1968 | Giammanco .................. 23/301 |
| 3,484,302 | 12/1969 | Maeda et al. .................. 23/301 |
| 3,505,032 | 4/1970 | Bennett .................. 23/301 |

Primary Examiner—Norman Yudkoff
Assistant Examiner—R. T. Foster
Attorney—Frank R. Trifari

[57] ABSTRACT

A method of producing calcite single crystals by floating-zone melting of a polycrystalline rod of calcium carbonate and an eutectic mixture, for example, of calcium carbonate and lithium carbonate which is introduced in the form of a pastille in contact with a seed crystal and which is displaced in the molten state in the direction of length of the rod subject to the action of a moving temperature gradient.

5 Claims, 1 Drawing Figure

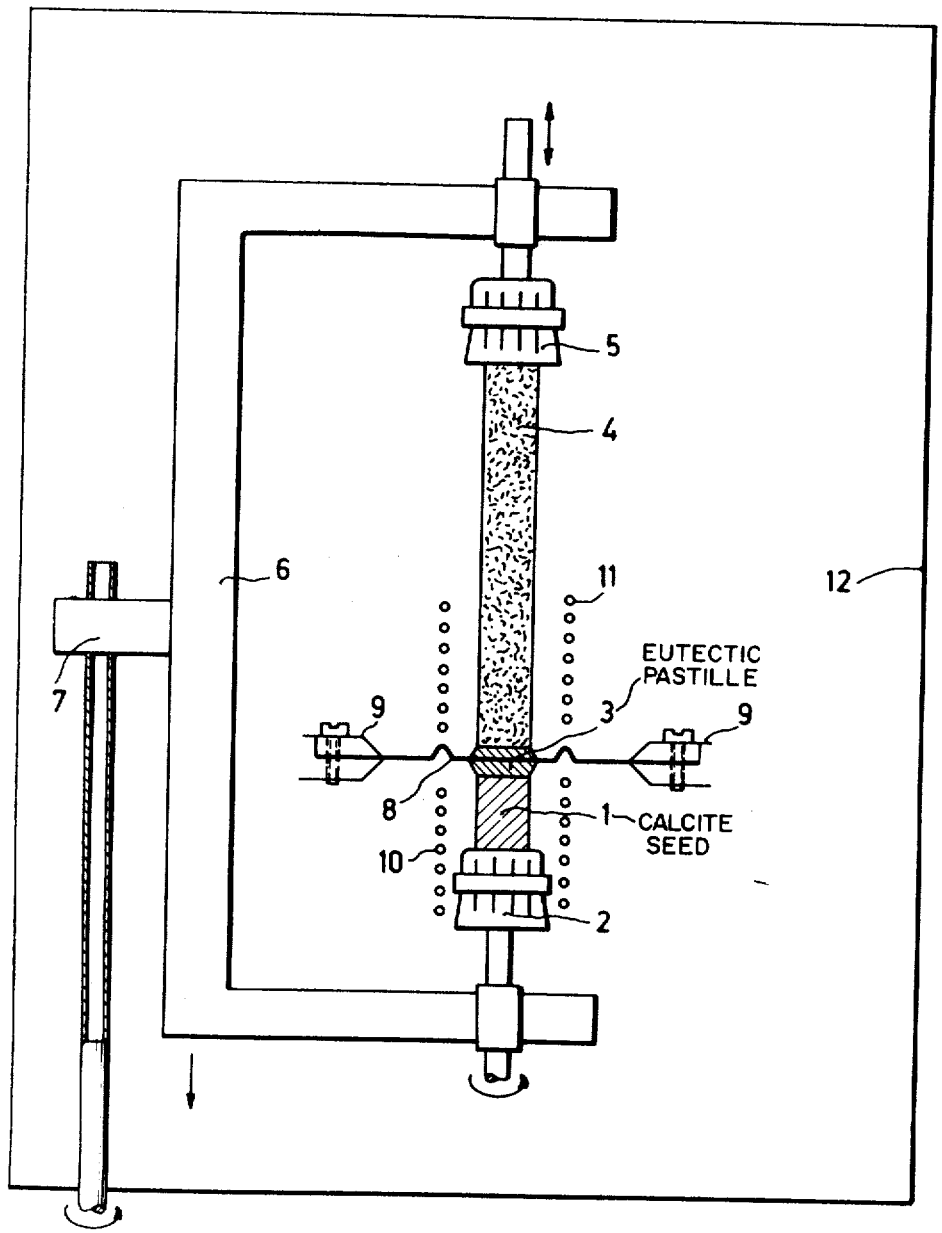

METHOD OF PRODUCING CALCIUM CARBONATE SINGLE CRYSTALS

The invention relates to a method of producing artificial calcite single crystals.

Doubly refracting, rhomboedric calcite single crystals are frequently employed on an industrial or semi-industrial scale, inter alia in devices employing polarized light or as supporting crystal for para-magnetic ions in lasers.

Since the natural locations of calcite, particularly on Iceland, are being exhausted and large crystals are of undiminishing interest in technology, it has been endeavoured to produce such crystals artificially.

From British Patent specification 1,049,347 a method of cultivating calcite crystals is known, in which calcium carbonate together with a melting agent, for example, lithium carbonate, or a mixture of lithium carbonate and potassium carbonate, the quantity of calcium carbonate exceeding the quantity corresponding to the eutectic composition, is heated in a carbon dioxide atmosphere so that at least a portion thereof melts without decomposing, after which at least a portion of the melt is cooled so that calcium carbonate crystallizes in the form of calcite.

By heating the eutectic mixture with calcium carbonate in the presence of at least one seed, calcite is, indeed, obtained in single crystal form after cooling, but these crystals are surrounded by the solidified eutectic composition. The chemical properties thereof and those of the calcite are similar to each other to an extent such that it is, in practice, not possible to isolate the crystals from the surrounding mass.

The present invention provides an elegant method of obtaining large, substantially pure calcite single crystals.

According to the invention the method of producing calcite single crystals with the aid of a seed crystal by melting and cooling polycrystalline calcium carbonate in the presence of an eutectic mixture is characterized in that the single crystal is obtained by floating-zone melting of a polycrystalline rod, while the eutectic mixture introduced in the form of a pastille in contact with the seed crystal is displaced in the molten state in the direction of length of the rod under the action of a moving temperature gradient.

Heating of the polycrystalline rod and formation of the single crystal are thus performed simultaneously. The rate of displacement of the zone corresponds with the rate of formation of the single crystal. The latter rate may lie between 50 and 500 $\mu$m an hour at a temperature of the molten zone between 700° C. and 900° C. Under these conditions the melting agent in the molten zone is constantly urged by diffusion towards the interface.

The rod of calcium carbonate to be used may be made by compressing fine powder with a very small quantity of solvent.

Suitable eutectic mixtures are inter alia the system $CaCO_3$—$Li_2CO_3$, mixtures containing at least one alkali salt such as $K_2CO_3$, KCl LiCl and lithium carbonate $Li_2CO_3$. Other metal salts may be added to the sintered calcium carbonate in order to produce doped crystals or mixed carbonates such as mixture crystals of calcium- and barium carbonate.

One example will now be described with reference to a drawing which shows schematically a device for growing artificial calcite crystals.

Seed crystal 1 is arranged in a holder 2, which is set rotating very slowly by means of a motor (not shown). On top of the seed crystal 1 a pastille 3 of the eutectic composition is arranged. On top of the pastil 3 is arranged the lower end of a rod 4 formed by a sintered calcium carbonate cylinder, which is held in vertical position coaxially with the seed crystal 1 by means of a holder 5. This holder 5 is slightly displaceable along its axis so that the molten zone can be contracted or enlarged in order to compensate for the capillary forces during the growing process. (This mechanism is not illustrated).

The holders 2 and 5 are connected with each other by means of a bracket 6, which is vertically displaceable along screwthread 7; the screw-thread is adapted to be turned with the aid of a motor (not shown).

The pastille 3 can be melted by irradiation with the aid of a heating-spirals, or preferably, by a metal tape 8, for example, of gold-plated platinum having small apertures at the center through which the melt can pass. The latter embodiment is shown in the drawing.

The tape 8 is heated by direct passage of current via the stationary electrodes 9.

In order to avoid thermal stress the auxiliary spirals 10 and 11 are provided to hold the crystalline rods at an appropriate temperature. The entire device is enclosed by an envelope 12 in which an excess pressure of carbon dioxide gas is constantly maintained in order to avoid decomposition of the calcium carbonate during the heating process. The envelope 12 is shown only schematically on the drawing and, as a matter of course, its dimensions are such that the bracket 6 is displaceable over a length at least equal to that of the rod 4.

The growing process includes melting of the eutectic pastil 3 by means of the heating tape 8 and the spirals 10 and 11. When the melt has uniformly wetted the seed crystal 1 and the rod 4, the bracket 6 is moved very slowly downwards, whereas the tape 8 remains at its place ....

The molten zone is thus displaced relatively to the seed crystal in the direction towards the holder 5 and it leaves a calcite single crystal behind.

The movement of the bracket 6 may be reversed, the seed crystal then being arranged above and the rod 4 below in the device.

This method permits of displacing a small quantity of melting agent and of obtaining a crystal not embedded in the melting agent.

WHAT IS CLAIMED IS:

1. A method of producing calcite single crystals comprising the steps, placing a seed crystal of calcium carbonate and a pastille of an eutectic mixture in contact with a polycrystalline rod of calcium carbonate, heating the polycrystalline calcium carbonate rod to melt the same, displacing the pastille in contact with the seed crystal in the direction of length of the rod under the action of a moving temperature gradient, and thereafter cooling the rod to form a single crystal of calcium carbonate.

2. A method of producing calcite single crystals as claimed in claim 1 wherein the rod is passed through a heating electrode having a plurality of apertures.

3. A method of producing a calcite single crystal as claimed in claim 1 wherein the rod contains another metal salt.

4. A method of producing a calcite single crystal as claimed in claim 3 wherein the rod contains as another metal salt a carbonate of another alkaline earth metal.

5. A method of producing a calcite single crystal as claimed in claim 1 in which the eutectic mixture is $CaCO_3 - LiCO_3$.

* * * * *